March 28, 1933. FUSE BLOCK Re. 18,779

2 Sheets-Sheet 1

Original Filed Jan. 16, 1930

INVENTOR.

BY Joseph Messing

Francis D. Hardcastle ATTORNEY.

J. MESSING

March 28, 1933. FUSE BLOCK Re. 18,779

2 Sheets-Sheet 2

Original Filed Jan. 16, 1930

INVENTOR.
Joseph Messing
BY
Francis H. Hardesty
ATTORNEY.

Reissued Mar. 28, 1933

Re. 18,779

UNITED STATES PATENT OFFICE

JOSEPH MESSING, OF DETROIT, MICHIGAN, ASSIGNOR TO BULL DOG ELECTRIC PRODUCTS COMPANY, OF DETROIT, MICHIGAN, A CORPORATION OF WEST VIRGINIA

FUSE BLOCK

Original No. 1,817,521, dated August 4, 1931, Serial No. 421,278, filed January 16, 1930. Application for reissue filed October 21, 1932. Serial No. 638,984.

This invention relates to fuse blocks and more particularly to blocks upon which may be mounted one or more fuses of various types.

It is an object of this invention to provide a block adapted to interchangeably receive a plug fuse or a cartridge fuse, as may be desired.

A further object of this invention is to provide means in or near a fuse block to cause the ejection of one or more of the fuses associated therewith.

It is a further object to provide a block in which cartridge fuses and/or plug fuses may be mounted and in which is disposed means to cause the ejection of one or more of the fuses mounted therein.

A still further object of this invention is to provide a block which is compact, economical of manufacture and in which fuses may be conveniently mounted.

A still further object is to provide, in a fuse block, a fuse ejector constructed to give a mechanical advantage to the operator.

Further objects of the invention will readily occur to those skilled in the art upon reference to the following description and the accompanying drawings, in which Fig. 1 is an exploded perspective view of parts of the device.

Figure 1:
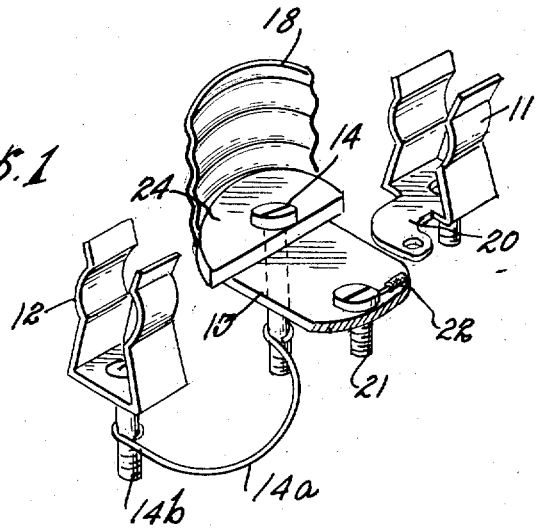

Referring more particularly to the drawings, Fig. 1 shows a pair of cartridge fuse receiving contact clips 11 and 12 between which is located a screw shell for receiving a plug fuse, not shown. The contact clip 11 is electrically connected to the base 13 of the shell and the other contact clip 12 is connected electrically to the center contact of the plug fuse receiving shell which in this case may be the screw 14, by means of the link or strap 14*a*. Accordingly, it will be noted that upon the insertion of a plug fuse or of a cartridge fuse, the line will be closed, permitting a flow of current therein.

The contact clips 11 and 12 are mounted in the fuse block 15 in appropriate recesses 16 and 17 and are longitudinally aligned and spaced from each other in the manner shown. The screw shell as above stated, is disposed between the clips and has a base portion 13 and a side wall 18, the latter having aligned slots 19 (Fig. 2) to provide a space in which may reside the cartridge fuse, the ends of which may be disposed in clips 11 and 12. When the device is assembled the slots 19 are longitudinally aligned with the contact clips, and since they are considerably larger in width than the diameter of the cartridge fuses, they provide a considerable clearance between the shell wall 18 and the cartridge fuse. The clip 11 is provided with an extension strip 20 which is electrically connected to the base 13 of the shell by means of the screw 21, the latter serving also to bind the conducting wire 22 to the shell base 13. The other contact clip 12 is electrically connected through screw 14*b* to an appropriate conductor in a manner which is not shown, since it appears to be obvious, and is also electrically connected with the center contact 14 of the shell by means of a link 14*a*, as previously stated. Center contact or screw 14 serves also to assist in securing the shell in the block 15, and is insulated from the shell by means of the semi-circular fiber disc 24 and the enlarged aperture 25 in the shell base 13. Screws 14 and 21 prevent rotation of the shell in the block.

The electrical circuits may be traced as follows: When a cartridge fuse is to be used, the plug fuse is removed and current passes from conductor 22 through screw 21 and extension strip 20 to contact clip 11, thence through the fuse and to clip 12 and then out to the line conductor not shown. Either one of these two fuses may be used, and since it is not necessary to use both at one time, my fuse block may be and preferably is made more compact by permitting the cartridge fuse to occupy the space otherwise occupied by the plug fuse.

Figure 2:
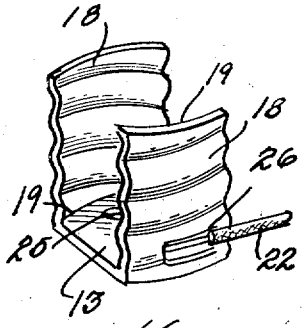
Fig. 2 shows the method of binding a conducting wire to the screw shell.
Figure 3:
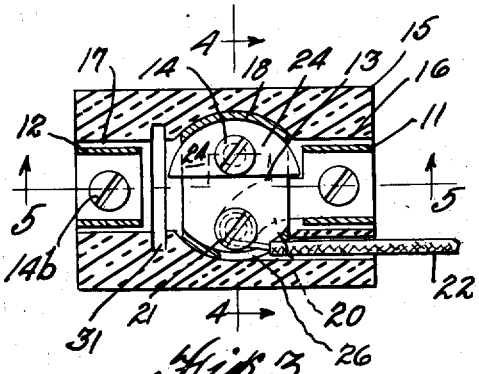
Fig. 3 is a plan view of a fuse block embodying my invention.
Figure 4:
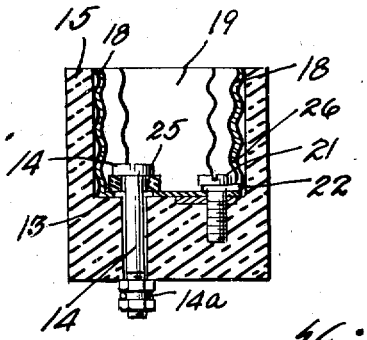
Fig. 4 is a section thereof along the line 4—4 of Fig. 3.
Figure 5:
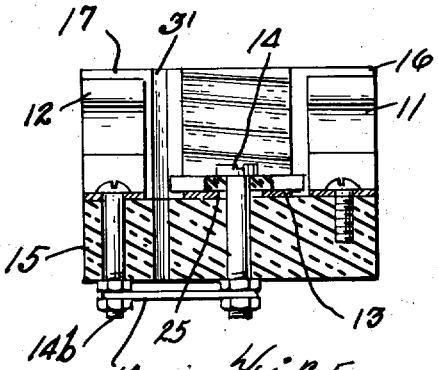
Fig. 5 is a section thereof along the broken line 5—5 of Fig. 3.

The binding of line wire or conductor 22 to its associated contact is shown best in Figure 2. The line wire 22 is shown entering the interior of the shell through slot 26 in the side wall 18 thereof, and it is fastened to the shell base 13 by the screw 21 previously referred to.

Figure 6:
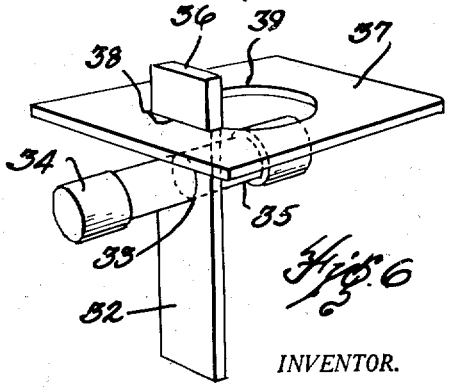
Fig. 6 shows, in perspective, means to cause the ejection of a cartridge fuse.

An important feature of my invention resides in the provision of an ejecting means for the cartridge fuse. Several forms of ejectors are shown, and are now described. One form, shown in Fig. 6, is mounted in a slot 31 which may, if desired, run through the block from top to bottom thereof, forming a guideway for the cartridge fuse ejector 32 of Fig. 6. The latter is provided with an aperture 33 through which projects the end 34 of the cartridge fuse 35. To lift the fuse 35 from its resting place in the clips 11 and 12, the handle 36 thereof is grasped and the ejector 32 is pulled out of the slot or guideway, the fuse 35 being accordingly carried along therewith. A cover plate 37 may be and preferably is provided, said plate having a slot 38 in which is disposed the ejector 32, and having a plug fuse receiving aperture 39.

Figure 7:
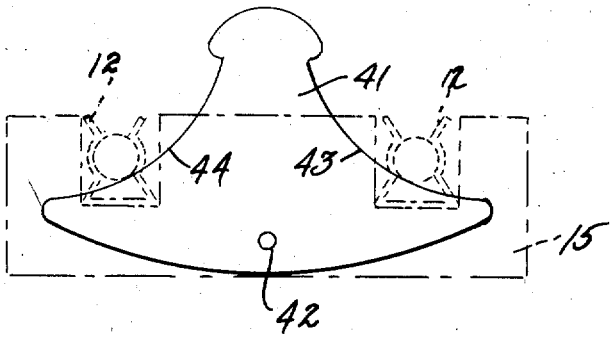
Fig. 7 shows, diagrammatically, ejecting means for either one or both of a pair of cartridge fuses.
Figure 8:
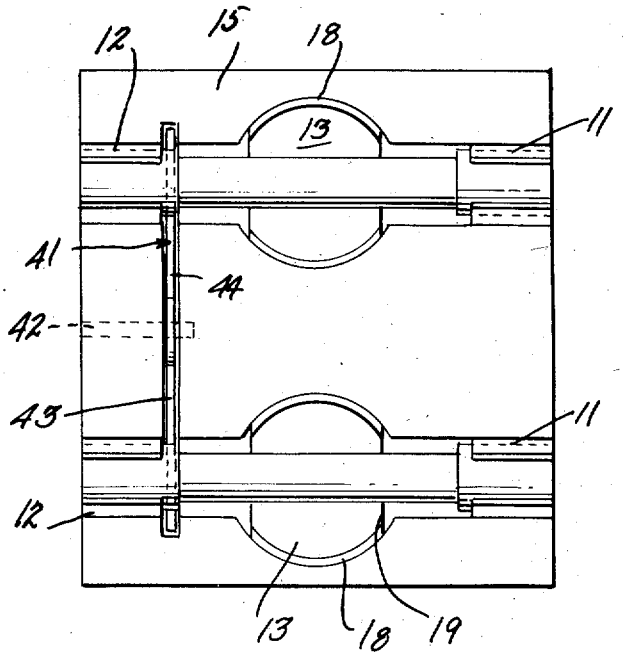
Fig. 8 is a plan view of a block for receiving a plurality of fuses of each type and shows the mounting of the ejecting means of Fig. 7.

Another means for ejecting the cartridge fuse from the clips 11 and 12 is shown in Figs. 7 and 8. In this modification, the block 15 is provided with four contact clips and with two plug receiving shells, the latter construction forming a multiple fuse block. Element 41, pivoted at 42, is provided to cause the ejection of either or both of the cartridge fuses.

Element 41 has cam faces 43 and 44 which are normally spaced from and are disposed below the cartridge fuses. Upon swinging of element 41 on its pivot 42 in either direction, one or the other of the fuses is caused to ride out of contact of the clips in a manner which will be obvious.

It will be observed that I can dispense with the screw shell, by threading the plug fuse into screw threads in the block, and by providing side wall contacts.

Figure 9:
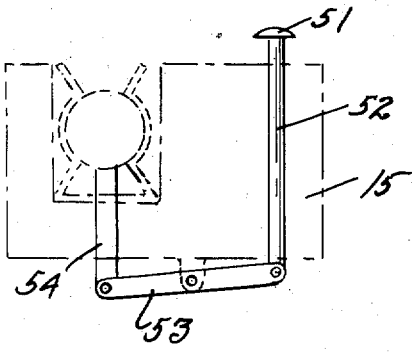
Fig. 9 shows, diagrammatically, another modification of the fuse ejecting means.

Fig. 9 shows a simple push button ejector. When button 51 on rod 52 is pushed inwardly of the block 15, link 53 and hammer 54 will cause the ejection of cartridge fuse in an obvious manner.

It will be seen, therefore, that I have provided a construction which can accommodate a cartridge fuse or a plug fuse in each branch thereof and which is extremely compact due to the fact that the cartridge fuse when used occupies the space otherwise occupied by the plug fuse.

It can further be seen that I have provided means to eject or cause the ejection of a cartridge fuse from the block in a manner which will dispense with the necessity of the operator's exposing his fingers to injury and danger of shock, the ejector being easily operable and conveniently mounted in or adjacent to the block.

It will further be observed that the ejector 41 is separate from and independent of the fuse and the fuse clips and further, is fulcrumed with respect to the block so that the ejector supplies a mechanical advantage to the user of the ejector operating as a lever, cam or the like on the fuses. Further, the ejector permits the operator to eject the fuses without the operator having to rely on straight pull on the fuses. Further, the ejector, whether it be of the form of Fig. 7, or of that of Fig. 9, supplies a directional and mechanical advantage to the operator, permitting the operator's fingers, moving in a convenient direction, to eject the rather inconveniently located fuses.

Further, while ejector 41 is shown as of insulation, it might well be of metal with a part only of insulation, enough to insulate the operator's finger from accidental contact with live parts, and/or enough to prevent any connection between the fuses of the pair.

Further, while the ejector 41 may be moved to lift the fuse completely out of the clips, it will be observed that a satisfactory operation may be obtained by moving the ejector only part of the way, lifting the fuse only part of the way, relying on the springiness of the clips to "snap" the fuse out, once the fuse has passed the middle part of the clip.

Now having described the invention and the preferred form of embodiment thereof, it is to be understood that the said invention is to be limited, not to the specific details herein set forth, but only by the scope of the claims which follow.

I claim:

1. A fuse block having contact clips to receive a cartridge fuse and having a screw shell to receive a plug fuse, the screw shell having a shell contact and a center contact, the shell contact being connected to one of the clips, and the center contact being connected to the other one of the clips, the block being adapted to receive a plug fuse or a cartridge fuse, the shell and the clips lying in substantially the same plane, and the shell being slotted so that a cartridge fuse can lie therein, transversely.

2. In a fuse block, aligned contact clips adapted to receive cartridge fuse and a screw shell between said clips adapted to receive a plug fuse, the screw shell having its cylindrical wall slotted to permit the cartridge fuse to occupy most of the space in said shell otherwise occupied by the plug fuse.

3. In a fuse block, aligned contact clips adapted to receive a cartridge fuse and a screw shell between said clips adapted to receive a plug fuse, the screw shell having its cylindrical wall slotted to permit the cartridge fuse to occupy most of the space in said shell which might otherwise be occupied by the plug fuse, and means mounted in said block and free of the fuse and operable to cause the ejection of the cartridge fuse from the clips, the means being of insulation and being disposed between the shell and that clip which is of opposite polarity with respect to it.

4. In a fuse block, aligned contact clips adapted to receive a cartridge fuse and a screw shell between said clips adapted to receive a plug fuse, the screw shell having its cylindrical wall slotted to permit the cartridge fuse to occupy most of the space in said shell which might otherwise be occupied by the plug fuse, and means mounted in said block and free of the fuse and operable to cause the ejection of the cartridge fuse from the clips, said means being so located as to permit free operation of the plug fuse, the means being disposed between the shell and one of the clips.

5. A fuse block comprising a base portion and a pair of upstanding walls, contact clips on said base between said walls, and a screw shell intermediate said contacts, said shell and said contacts being in substantial alignment along at least two axes, said shell having slots in its side wall in alignment with said contacts.

6. A fuse block comprising a base portion and a pair of upstanding side walls, contact clips on said base between said walls and a screw shell intermediate said contacts, said shell and said contacts being in substantial alignment along at least two axes, said block having mounted thereon means to cause the ejection of a cartridge fuse from said contact clips, the means being permanently mounted in the block, free of the fuse, between the shell and a clip.

7. In a fuse block, aligned contact clips adapted to receive a cartridge fuse and a screw shell between said clips adapted to receive a plug fuse, the screw shell having its cylindrical wall slotted to permit the cartridge fuse to occupy most of the space in said shell occupied otherwise by the plug fuse, and means electrically connecting one of the contact clips to said shell.

8. In a fuse block aligned contact clips adapted to receive a cartridge fuse and a screw shell between said clips adapted to receive a plug fuse, said screw shell having its cylindrical wall slotted to permit the cartridge fuse to occupy most of the space in said shell otherwise occupied by the plug fuse, and means electrically connecting one of the contact clips to said shell, comprising a conducting strap on said clip fastened to said shell at the base thereof.

9. In a fuse block, contact clips adapted to receive a cartridge fuse and a screw shell aligned with and intermediate said clips adapted to receive a plug fuse, said shell comprising a base portion and spaced wing portions extending therefrom, the space between the wings being such as to enable a cartridge fuse to lie therein transversely.

10. In a fuse block, contact clips adapted to receive a cartridge fuse and a screw shell aligned with and intermediate said clips adapted to receive a plug fuse, said shell comprising a base portion and wing portions extending therefrom, said wing portions being spaced from each other to enable a cartridge fuse to occupy most of the space therebetween.

11. In a fuse block, contact clips adapted to receive a cartridge fuse, a screw shell aligned with and intermediate said clips adapted to receive a plug fuse, said shell comprising a base portion and wing portions extending therefrom, and means on said block between the shell and a clip and adapted to cause the ejection of a cartridge fuse from said clips.

12. In a fuse block, contact clips adapted to receive a cartridge fuse, a screw shell aligned with and intermediate said clips adapted to receive a plug fuse, said shell comprising a base portion and wing portions extending therefrom, said wing portions being spaced from each other to enable a cartridge fuse to occupy most of the space therebetween, and means on said block between the shell and a clip and adapted to cause the ejection of a cartridge fuse from said clips.

13. In a fuse block, contact clips adapted to receive a cartridge fuse, a screw shell aligned with and intermediate said clips adapted to receive a plug fuse, and means on said block between the shell and a clip and adapted to cause the ejection of a cartridge fuse from said clips, said means being so located as to permit free operation of the plug fuse.

14. In a fuse block, means to receive a cartridge fuse, and means to receive a plug fuse, both of said means being substantially coplanar and so disposed with respect to each other that only one or the other of the fuses may be used at the same time.

15. In a fuse block, contact clips adapted to receive a cartridge fuse, a screw shell aligned with and intermediate said clips adapted to receive a plug fuse, said shell comprising a base portion and wing portions extending therefrom, and means on said block between the shell and a clip and adapted to cause the ejection of a cartridge fuse from said clips, said means being so located as to permit free operation of the plug fuse.

16. In a fuse block, contact clips adapted to receive a cartridge fuse, a screw shell aligned with and intermediate said clips adapted to receive a plug fuse, said shell comprising a base portion and wing portions extending therefrom and spaced from each other to enable a cartridge fuse to occupy most of the space therebetween, and means on said block between the shell and a clip and adapted to cause the ejection of a cartridge fuse from said clips, said means being so located as to permit free operation of the plug fuse.

17. In a fuse block, fuse clips adapted to receive between them a cartridge fuse, and an ejector means separate from and independent of said fuse and fulcrumed with respect to said block and movable to eject said fuse from said clips, the mounting of the ejector giving the operator an advantage over the fuse holding influence of the clips.

18. In a fuse block, fuse clips adapted to receive between them a cartridge fuse, and an ejector means separate from and independent of said cartridge fuse and fulcrumed with respect to said block and movable to eject said fuse, from said clips, the mounting of the ejector giving the operator a mechanical advantage over the fuse holding influence of the clips.

19. In a fuse block, fuse clips for holding a cartridge fuse, and means, separate from and independent of said fuse, and fulcrumed with respect to said block and adapted to be moved to a position where it engages the fuse and forces it out of the clips, the mounting of the ejector giving the operator a directional advantage over the fuse holding influence of the clips.

20. In a fuse block, fuse clips adapted to receive between them a cartridge fuse, and an ejector means pivotally mounted in said block separate and independent of said cartridge fuse and movable to eject said fuse.

21. In a fuse block, alined fuse clips, a cartridge fuse connecting and held in the block by said clips, and means pivotally mounted in the block independent of said fuse and said clips so as to be moved to a position where it engages the fuse and forces it out of the clips.

22. In a fuse block, a plurality of fuse clips, a plurality of cartridge fuses connecting and held in the block by said clips and means mounted in said block independent of the fuses and movable to eject one or more of said fuses as desired.

23. In a fuse block, a plurality of fuse clips, a plurality of cartridge fuses connecting and held in the block by said clips, screw shells between the clips of each pair, and means mounted in said block independent of the fuses and movable to eject one or more of said fuses, as desired, the means being between the shell and a clip.

24. In a fuse block, fuse clips adapted to receive between them a cartridge fuse, and an ejector means, separate from an independent of said cartridge fuse and said clips and pivotally mounted with respect to said block and movable to eject said fuse.

25. In a fuse block, alined fuse clips, a cartridge fuse connecting and held in the block by said clips, and means separate from and independent of said cartridge fuse and said clips and pivotally mounted with repect to said block and fuse and movable to eject said fuse.

26. In a fuse block, alined fuse clips, a cartridge fuse connecting and held in the block by said clips, and means separate from and independent of said cartridge fuse and said clips and made of insulating material and pivotally mounted with respect to said block and movable to eject said fuse.

27. In combination, a fuse clip for holding the end of a cartridge fuse, and an ejector means separate from and independent of said fuse and said clips and, constructed and mounted to be movable by the operator to eject the fuse from the clip, and to give a mechanical advantage to the operator over the fuse holding influence of the clip.

28. In combination, a fuse clip for holding the end of a cartridge fuse, and an ejector means separate from and independent of said fuse and said clips and, constructed and mounted to be movable by the operator to eject the fuse from the clip, the ejector being fulcrumed with respect to the fuse so as to give the operator a mechanical advantage over the fuse holding influence of the clip.

29. In combination, a fuse clip for holding the end of a cartridge fuse, and an ejector means separate from and independent of said fuse and said clips and, constructed and mounted to be movable by the operator to eject the fuse from the clip, the ejector being fulcrumed with respect to the fuse so as to give the operator a directional advantage over the fuse holding influence of the clip.

30. In combination, a fuse clip for holding the end of a cartridge fuse, and an ejector means separate from and independent of said fuse and said clips and, constructed and mounted to be movable by the operator to eject the fuse from the clip, the ejector being fulcrumed with respect to the fuse so as to give the operator a mechanical and directional advantage over the fuse holding influence of the clip.

31. In combination, a fuse clip comprising resilient retroverted jaws formed to have a tendency to eject a fuse completely, after the fuse is moved more than half way out of the clip, an ejector means separate from and independent of said fuse and said clips and, constructed and mounted to be movable by the operator to lift the fuse at least part way out of the clip, the resiliency of the clip then tending to move the fuse end completely out of the clip.

32. In combination, a fuse clip comprising resilient retroverted jaws formed to have a tendency to eject a fuse completely after the fuse is moved more than half way out of the clip, an ejector means separate from and independent of said fuse and said clips and, constructed and mounted to be movable by the operator to lift the fuse at least part way out of the clip, the resiliency of the clip then tending to move the fuse end completely out of the clip, the ejector being so formed and mounted as to give the operator an advantage over the fuse holding influence of the clip.

33. In combination, a fuse clip comprising resilient retroverted jaws formed to have a tendency to eject a fuse completely after the fuse is moved more than half way out of the clip, an ejector means separate from and independent of said fuse and said clips and, constructed and mounted to be movable by the operator to lift the fuse at least part way out of the clip, the resiliency of the clip then tending to move the fuse end completely out of the clip, the ejector being so formed and mounted as to give the operator a mechanical advantage over the fuse holding influence of the clip.

34. In combination, a fuse clip comprising resilient retroverted jaws formed to have a tendency to eject a fuse completely after the fuse is moved more than half way out of the clip, an ejector means separate from and independent of said fuse and said clips and, constructed and mounted to be movable by the operator to lift the fuse at least part way out of the clip, the resiliency of the clip then tending to move the fuse end completely out of the clip, the ejector being so formed and mounted as to give the operator a directional advantage over the fuse holding influence of the clip.

In testimony whereof, I sign this specification.

JOSEPH MESSING.